United States Patent Office 3,507,851
Patented Apr. 21, 1970

3,507,851
SYNTHESIS DERIVATIVES OF AGAROSE HAVING APPLICATION IN ELECTROPHORESIS ON GEL AND IN CHROMATOGRAPHY
Victor Ghetie, Sos. Oltenitei 67–69; Grigoras Dan Motet, Str. Bateriilor 4; and Dithelm Horst Schell, Balta Alba, bloc 39, all of Bucharest, Rumania
No Drawing. Filed Feb. 20, 1967, Ser. No. 617,062
Claims priority, application Rumania, Mar. 24, 1966, 51,181
Int. Cl. C02b *1/56;* C07c *47/18;* C08b *19/00*
U.S. Cl. 260—209      2 Claims

ABSTRACT OF THE DISCLOSURE

These compounds are derivatives of agarose, being obtained both by introducing diethyl-aminoethyl and carboxymethyl groups into the molecule of agarose thereby obtaining products which can be used in electrophoresis, immunoelectrophoresis, and in chromatography in columns as ion-exchanging gels, or by crosslinking agarose with epichlorohydrin thereby obtaining products with gel-filtering properties, or by introducing diethyl-aminoethyl and carboxymethyl groups into the molecule of cross-linked agarose thereby obtaining products with no gelling capacity but, endowed with ion-exchanging properties.

---

The present invention relates to a series of synthetic derivatives of agarose obtained by the coupling of the hydroxyl groups of a polysaccharide molecule with 1-chloro-2-diethyl aminoethane, with monochloro-acetic acid and from cross linkage of agarose with epichlorohydrin either alone or followed by the introduction of diethyl-aminoethyl or carboxymethyl groups.

Such synthetic derivatives of agarose are not known. Similar compounds obtained by introducing diethyl-aminoethyl and carboxymethyl groups into cellulose or by cross linkage of dextrane with epichlorohydrin (diethyl-aminoethyl-cellulose, carboxy-methyl-cellulose, Sephadex filtering gel) are known.

According to the invention, two main categories of new products were obtained:

(1) Soluble products having gelling and ion-exchanging properties (ion-exchanging gels);
(2) Insoluble products having molecular sieve and ion-exchanging properties.

The first category of substances which includes diethyl-aminoethyl-agarose and carboxymethyl-agarose can be used in electrophoresis and immunoelectrophoresis as ion-exchanging gels permitting the separation of macromolecular compounds not only by their total electric charges but also by their adsorptive properties.

The secondary category of substances includes:

(a) The agarose cross linked with epichlorohydrin which gives compounds having gelling-filtering properties;
(b) The agarose cross linked by glyceric bridges into which were subsequently introduced diethyl-aminoethyl or carboxymethyl groups which can be used in ion-exchanging chromatography.

The above mentioned products are obtained by known chemical methods starting from agarose.

Examples of the application of the invention are given as follows.

EXAMPLE 1

Ten g. of agarose was gradually introduced into 30 ml. of 5 N sodium hydroxide solution cooled to about 0° C. by homogenizing the resulting mass with a rod for 25–35 minutes. Then, 6 g. of 1-chloro-2-diethyl-aminoethane hydrochloride dissolved in 12 ml. of distilled water are added in small portions at the same temperature (0° C.). The reaction mixture after being thoroughly homogenized for 30 minutes, is introduced into the reaction vessel and warmed for 30 minutes in a water bath at a temperature of 80–85° C., and with stirring from time to time. The mixture is again cooled in an ice bath and, the gel is broken in the presence of 100–150 ml. cooled distilled water. Then the mixture is filtered by means of a water-jet pump on a filtrating funnel G1, washed with a cooled 1 N solution hydroxide solution, then with 1 N hydrochloric acid solution, and again with 1 N sodium hydroxide solution, the solutions being well cooled. The mass obtained on the filter is suspended in 800 ml. of cooled distilled water and stored overnight in the refrigerator. On the second day, the supernatant liquid is decanted, the reaction product is washed with cooled distilled water by repeated decantings until a neutral reaction is obtained and then, it is dehydrated with ethanol and dried.

7.5 g. of diethyl-aminoethyl agarose are obtained with a content of about 1 mequiv./g. of basic groups.

EXAMPLE 2

10 g. of agarose are gradually introduced into 35 ml. of 10 N sodium hydroxide solution cooled to about 0° C., the mixture being stirred during the introduction. Five g. of monochloro-acetic acid dissolved in 6 ml. distilled water are then added in several portions; the reaction mixture is thoroughly homogenized and heated for 30 minutes in a water bath having a temperature of 70–75° C. After cooling in an ice bath, the reaction product is triturated in 100 ml. of 10% acetic acid and suspended in 400 ml. of cooled water. After settling, the reaction product is washed by decantation with cooled distilled water until its discoloration. The product is then vacuum filtered by means of a water-jet pump on a funnel G1, then suspended in 18 ml. of glacial acetic acid. It is again filtered and washed with cool distilled water until the reaction of the filtrate becomes neutral. The product is dehydrated with ethanol and dried. Six g. of carboxymethyl agarose are obtained with a content of about 1 mequiv./g. acid groups.

EXAMPLE 3

Ten g. of agarose are gradually introduced into 30 ml. of 5 N sodium hydroxide solution cooled to about 0° C. After about 30 minutes of homogenization, 3 g. of epichlorohydrin are added in 3–4 cooled portions, and the contents of the reaction vessel are thoroughly mixed for 20–30 minutes. The vessel containing the reaction mixture is then warmed for an hour on a water bath at a temperature of 40–45° C., and the mixing is continued until a fragile gel is formed which is broken up into small particles. For completing the reaction, the warming is continued for 2–3 hours up to a temperature of 70–75° C. The reaction product is then cooled, repeatedly washed with distilled water by decanting, mechanically broken up in small particles and then stored overnight in 800–1000 ml. of distilled water. On the next day, the supernatant product is decanted and, the gel particles are again washed several times with distilled water until the filtrate shows a neutral reaction. The product is then filtered on a glass funnel G1, dehydrated with ethanol, and dried. 10.5 g. agarose cross-linked by glyceric brides are obtained.

EXAMPLE 4

Ten g. of cross-linked agarose are gradually introduced with constant stirring into 30 ml. of 5 N sodium hydroxide solution cooled to about 0° C. After 30 minutes, 6 g. of 1-chloro-2-diethyl aminoethane hydrochloride dissolved in 12 ml. of distilled water are added to the product which looks almost dry, the mixture is stirred from time to time, and after 30 minutes it is heated for 30–40 minutes on a water bath at 85° C. The reaction product is then cooled, washed repeatedly with distilled water, then with 1 N sodium hydroxide solution and with 1 N hydrochloric acid solution, and filtered. The product remaining on the filter is then treated with equal quantities of 40 ml. of 1 N sodium hydroxide and 1 N hydrochloric acid solutions, and then again with 40 ml. of 1 N sodium hydroxide solution, with filtering each time in vacuum. The product remaining on the filter is then again suspended in 40 ml. of 1 N sodium hydroxide solution, diluted with 150 ml. of distilled water, and stored overnight. On the second day, the supernatant product is decanted, washed several times with distilled water by decanting, filtered, and then dehydrated with ethanol and dried. 8.5 g. of cross-linked diethyl-aminoethyl agarose are obtained containing about 0.8 mequiv./g. of basic groups.

EXAMPLE 5

Example 2 is repeated using, however, 10 g. of cross-linked agarose instead of the 10 g. simple agarose. Finally, 10 g. of cross-linked agarose are obtained containing about 0.9 mequiv./g. of acid groups.

EXAMPLE 6

Example 1 is repeated using however only 3 g. of 1-chloro-2-diethyl aminoethane hydrochloride, that is 50% of the above quantity used in the mentioned example. The diethyl-aminoethyl agarose thus obtained contains a quantity of 0.6 mequiv./g. of basic groups.

EXAMPLE 7

Example 3 is repeated using, however, only 1.5 g. epichlorohydrin. 10.5 g. of a product with a less dense lattice are obtained.

EXAMPLE 8

Example 3 is repeated using, however, this time only 0.75 g. of epichlorohydrin. 8 g. of cross-linked agarose are obtained.

EXAMPLE 9

Example 3 is repeated using, however, only 0.2 g. of epichlorohydrin. The resulting product (8 g.) has a great retention capacity for water and its lattice is less dense as compared with the compounds obtained according to Examples 3, 7, and 8.

In the above mentioned examples, the dehydration of the gel particles can also be carried out with acetone. Also, the amounts of 1-chloro-2-diethyl aminoethane hydrochloride, monochloro-acetic acid, or epichlorohydrin may be varied by applying other proportions than those specified; thus there are obtained compounds which differ in respect to their characteristics physico-chemical properties. The dehydrated and dried gels have been mechanically broken and selectively sieved in order to separate products with a desired grain size.

The present invention has the following advantages:

By introducing diethyl-aminoethyl and carboxymethyl groups into the molecule of agarose, products are obtained which permit the preparation of a new electrophoretic technique by using ion-exchanging gels which permit separation of macromolecular compounds both by the criterion of the global electric charges and by the criterion of the distribution of the electric groups over the surface of the molecule; these gels may also be in immunodiffusion;

By preparing cross linkage of agarose with epichlorohydrin, products are obtained which may be used in both the separation of various compounds by the criterion of their molecular weight and in the concentration of the solutions containing macromolecular substances;

By introducing diethyl-aminoethyl and carboxymethyl groups into the cross-linked agarose, products are obtained which may be used in the chromatographic separation of macromolecules, the same as the other known ion-exchangers based on cellulose and dextran and also, eventually, for the separation of subcellular fractions.

What is claimed is:
1. Agarose having the molecules thereof cross-linked with epichlorohydrin.
2. Agarose products selected from the group consisting of agarose and the said cross-linked agarose of claim 1, modified by groups selected from diethyl-aminoethyl and carboxymethyl.

References Cited

UNITED STATES PATENTS

| | | | |
|---|---|---|---|
| 2,856,398 | 10/1958 | Novak. | |
| 2,917,506 | 12/1959 | Caldwell et al. | 260—209 |
| 3,275,576 | 9/1966 | Flodin et al. | 260—209 |
| 3,281,409 | 10/1966 | Blethen | 260—209 |
| 3,303,184 | 2/1967 | Nordgren | 260—209 |

LEWIS GOTTS, Primary Examiner

J. R. BROWN, Assistant Examiner

U.S. Cl. X.R.

210—37, 38; 252—316